US012650574B2

(12) United States Patent
Han et al.

(10) Patent No.:     US 12,650,574 B2
(45) Date of Patent:         Jun. 9, 2026

(54) SPATIAL DIVISION STRUCTURE AND LIGHT REFLECTION DEVICE AND LIDAR SCANNING SYSTEM HAVING SAME

(71) Applicant: HL KLEMOVE CORP., Incheon (KR)

(72) Inventors: Yun Ki Han, Gyeonggi-do (KR); HoSeok Shin, Gyeonggi-do (KR); HakGu Han, Gyeonggi-do (KR); Chulseung Lee, Incheon (KR); Yong Min Park, Gyeonggi-do (KR); Hyuk Ryu, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 956 days.

(21) Appl. No.: 17/878,908

(22) Filed: Aug. 2, 2022

(65) Prior Publication Data

US 2023/0035782 A1     Feb. 2, 2023

(30) Foreign Application Priority Data

Aug. 2, 2021     (KR) ......................... 10-2021-0101228

(51) Int. Cl.
G02B 7/182          (2021.01)
G01S 7/481          (2006.01)
(Continued)

(52) U.S. Cl.
CPC .......... G02B 7/1821 (2013.01); G01S 7/4817 (2013.01); G01S 17/10 (2013.01); G02B 5/09 (2013.01); G02B 26/12 (2013.01)

(58) Field of Classification Search
CPC ........ G02B 7/1821; G02B 5/09; G02B 26/12; G02B 7/182; G01S 7/4817; G01S 17/10; G01S 17/42; G01S 7/481; G01S 17/88
See application file for complete search history.

(56) References Cited

U.S. PATENT DOCUMENTS

2019/0041501 A1     2/2019  Noguchi
2019/0212419 A1*    7/2019  Jeong ...................... G01S 17/08
(Continued)

FOREIGN PATENT DOCUMENTS

CN       111580114       8/2020
JP       2000-121979     4/2000
(Continued)

OTHER PUBLICATIONS

Office Action dated Aug. 21, 2024 for Korean Patent Application No. 10-2021-0101228 and its English translation from Global Dossier.
Notice of Allowance dated Apr. 24, 2025 for Korean Patent Application No. 10-2021-0101228 and Its English translation provided by Applicant's foreign counsel.

*Primary Examiner* — Isam A Alsomiri
*Assistant Examiner* — Joseph C Fritchman
(74) *Attorney, Agent, or Firm* — WOMBLE BOND DICKINSON (US) LLP

(57)               ABSTRACT
Disclosed is a spatial division structure. A spatial division structure according to an exemplary embodiment of the present invention is mounted to divide a reflective surface of a rotary reflection structure provided in the form of a polyhedron and configured to reflect light and includes a blocking plate having therein an insertion space into which the rotary reflection structure is inserted, the blocking plate having a board shape extending in a direction perpendicular to a rotation axis of the rotary reflection structure from the reflective surface to divide the reflective surface into a first reflective surface and a second reflective surface, and frames configured to fix a position of the blocking plate to the reflective surface, in which the frames include one or more first frames connected to the blocking plate and positioned at a lateral side of the first reflective surface, the one or more first frames extending in a direction of the rotation axis of the rotary reflection structure, and one or more second (Continued)

frames each connected to one end of each of one or more first frames and positioned at an upper side of the first reflective surface, the one or more second frames extending to cross the one or more first frames.

13 Claims, 10 Drawing Sheets

(51) Int. Cl.
 *G01S 17/10* (2020.01)
 *G02B 5/09* (2006.01)
 *G02B 26/12* (2006.01)

(56) References Cited

U.S. PATENT DOCUMENTS

| | | | |
|---|---|---|---|
| 2020/0355800 A1* | 11/2020 | Toyama | ................ G01S 7/4816 |
| 2021/0247492 A1* | 8/2021 | Han | .................... G02B 26/123 |
| 2023/0028159 A1* | 1/2023 | Yang | ................. G02B 27/0955 |

FOREIGN PATENT DOCUMENTS

| | | | | |
|---|---|---|---|---|
| JP | 2000121979 A | * | 4/2000 | |
| JP | 2001-051225 | | 2/2001 | |
| KR | 10-1674062 | | 11/2016 | |
| KR | 20180080383 A | * | 7/2018 | .......... G01S 7/4814 |
| KR | 10-2019-0130495 | | 11/2019 | |
| WO | WO-2017082540 A1 | * | 5/2017 | ......... G06K 7/10683 |

* cited by examiner

10

36

30

SPATIAL DIVISION STRUCTURE AND LIGHT REFLECTION DEVICE AND LIDAR SCANNING SYSTEM HAVING SAME

CROSS REFERENCE TO RELATED APPLICATION

The present application claims priority to Korean Patent Application No. 10-2021-0101228, filed on Aug. 2, 2021, the entire contents of which is incorporated herein for all purposes by this reference.

BACKGROUND OF THE INVENTION

Field of the Invention

The present invention relates to a spatial division structure, a light reflection device, and a lidar scanning system including the same, and more particularly, to a spatial division structure configured to spatially divide a rotating reflective surface of a light reflection device, the light reflection device, and a lidar scanning system including the same.

Description of the Related Art

Electronic devices for collecting spatial information of particular regions have been developed. Among the electronic devices, an electronic device, which is called an optical scanner, a laser scanner, or the like and detects a distance from an object by using a laser beam, has been actively developed.

The electronic devices using the laser beams are used in various fields related to vehicles, mobile robots, ships, security systems, assembly lines, unmanned aircrafts, drones, and the like, and the field of use of electronic devices is also expanding in various ways. In particular, there are rapid increasing research and demand related to light reflection devices of lidar scanners associated with vehicle autonomous driving that has recently been in the limelight.

Meanwhile, an operational principle of the electronic device using the laser beam will be described below. First, the laser beam is periodically emitted toward a scanning region by a light deflection device. Thereafter, the laser beam returned by a detected object is detected by a sensor and evaluated by a controller. In this case, an angular position of the detected object is determined based on information on an angular position of the light deflection device. In addition, information on a distance of the detected object is determined based on time of flight (TOF) by the controller.

A very precise level of a device is required to minimize the occurrence of error in order to accurately analyze spatial information by detecting the light as described above. Therefore, the electronic device using the laser beam is required to have a configuration capable of minimizing noise during a process of reflecting the light. In addition, the electronic device using the laser beam is required to have a structure capable of maintaining a high level of precision despite a motion of the device itself. Furthermore, the electronic device using the laser beam needs to have a structure advantageous in manufacturing while obtaining the above-mentioned effect.

DOCUMENT OF RELATED ART (Patent Document 1) Japanese Patent Application Laid-Open No. 2001-051225A (published on Feb. 23, 2001)

SUMMARY OF THE INVENTION

The present invention is proposed to solve these problems and aims to provide a spatial division structure including a blocking plate capable of preventing interference caused by an optical signal and being installed without concern that a reflective surface is damaged, a light reflection device, and a lidar scanning system including the same.

The present invention also aims to provide a spatial division structure including a blocking plate capable of preventing interference caused by an optical signal, the spatial division structure being capable of maximally ensuring an area of a reflective surface and facilitating a manufacturing process, a light reflection device, and a lidar scanning system including the same.

One aspect of the present invention provides a spatial division structure, which is mounted to divide a reflective surface of a rotary reflection structure provided in the form of a polyhedron and configured to reflect light, the spatial division structure including: a blocking plate having therein an insertion space into which the rotary reflection structure is inserted, the blocking plate having a board shape extending in a direction perpendicular to a rotation axis of the rotary reflection structure from the reflective surface to divide the reflective surface into a first reflective surface and a second reflective surface; and frames configured to fix a position of the blocking plate to the reflective surface, in which the frames include: one or more first frames connected to the blocking plate and positioned at a lateral side of the first reflective surface, the one or more first frames extending in a direction of the rotation axis of the rotary reflection structure; and one or more second frames each connected to one end of each of one or more first frames and positioned at an upper side of the first reflective surface, the one or more second frames extending to cross the one or more first frames.

In this case, the polyhedron on which the spatial division structure is mounted may have a rectangular parallelepiped shape.

In this case, an outer periphery of the blocking plate may have a circular shape.

In this case, the insertion space may be coincident with a horizontal cross-sectional shape of the rotary reflection structure.

In this case, the first frame and the second frame may be positioned to be perpendicular to each other.

In this case, one or more of the one or more first frames and the one or more second frames may extend while surrounding an edge constituting the rotary reflection structure.

In this case, one or more of the one or more first frames and the one or more second frames may be bent in a shape including surfaces that meet in a perpendicular direction.

In this case, the spatial division structure may further include a third frame formed to adjoin a lower side of the first reflective surface and extending to cross the first frame.

In this case, a bonding agent may be applied onto at least a part of a contact surface of the frame, which adjoins the first reflective surface among the first to third frames, such that the spatial division structure is fixed to the rotary reflection structure.

In this case, the spatial division structure may be fixed to the rotary reflection structure by using a coupling member having one side portion connected to at least any one of the first to third frames and the other side portion connected to the rotary reflection structure.

In this case, the spatial division structure may be integrally manufactured in a state in which the spatial division structure includes all the blocking plate, the first frame, and the second frame.

The spatial division structure may be formed in a hat shape.

Another aspect of the present invention provides a light reflection device including: a rotary reflection structure provided in the form of a polyhedron and having one or more reflective surfaces configured to reflect light; and a spatial division structure mounted by being fitted with the rotary reflection structure in a direction of a rotation axis from above the rotary reflection structure to divide the reflective surface, in which the spatial division structure includes: a blocking plate having therein an insertion space into which the rotary reflection structure is inserted, the blocking plate having a board shape extending in a direction perpendicular to a rotation axis of the rotary reflection structure from the reflective surface to divide the reflective surface into a first reflective surface and a second reflective surface; and frames configured to fix a position of the blocking plate to the reflective surface, and in which the frames include: one or more first frames connected to the blocking plate and positioned at a lateral side of the first reflective surface, the one or more first frames extending in a direction of the rotation axis of the rotary reflection structure; and one or more second frames each connected to one end of each of one or more first frames and positioned at an upper side of the first reflective surface, the one or more second frames extending to cross the one or more first frames.

Still another aspect of the present invention provides a lidar scanning system including: the light reflection device; a light output means configured to emit an optical signal toward the light reflection device; and a light receiving means configured to receive the optical signal reflected from the light reflection device, in which the optical signal is a pulsed laser beam.

According to the embodiment of the present invention, the spatial division structure having the frame structure is mounted on the rotary reflection structure. Therefore, the blocking plate may prevent interference between the optical signals, and it is possible to prevent damage that may occur on the reflective surfaces when the blocking plate is installed.

According to the embodiment of the present invention, the reflective surface is not damaged when the blocking plate is installed by using the spatial division structure having the frame structure. Therefore, it is possible to maximally ensure an area of the reflective surface capable of reflecting the optical signal.

According to the embodiment of the present invention, the rotary reflection structure and the spatial division structure may be separately manufactured and then easily coupled to each other. Therefore, it is possible to securely couple the rotary reflection structure and the spatial division structure while improving efficiency related to the process of coating the reflective surface and the manufacturing process.

DETAILED DESCRIPTION OF THE INVENTION

Figure 1:
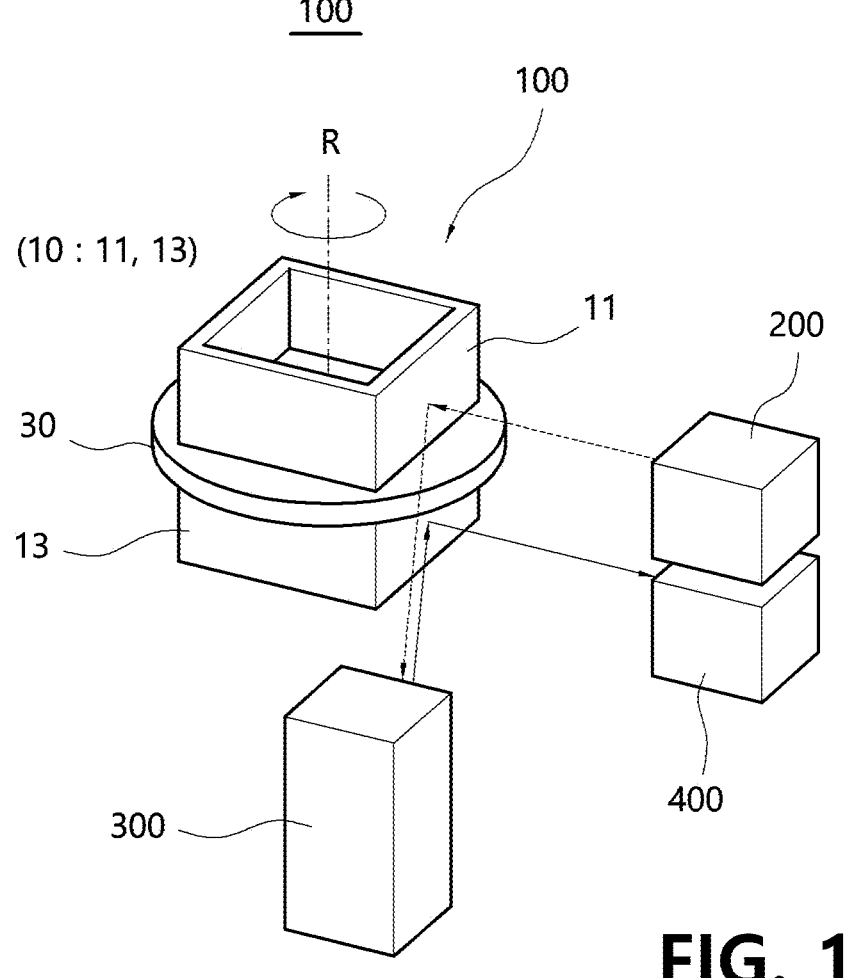
FIG. 1 is a perspective view illustrating a lidar system including a light reflection device.

Hereinafter, an embodiment of the present invention will be described in detail with reference to the accompanying drawings so that those skilled in the technical field to which the present invention pertains may easily carry out the embodiment. The present invention may be implemented in various different ways, and is not limited to the embodiments described herein. In the drawings, a part irrelevant to the description will be omitted to clearly describe the present invention, and the same or similar constituent elements will be designated by the same reference numerals throughout the specification.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 2:
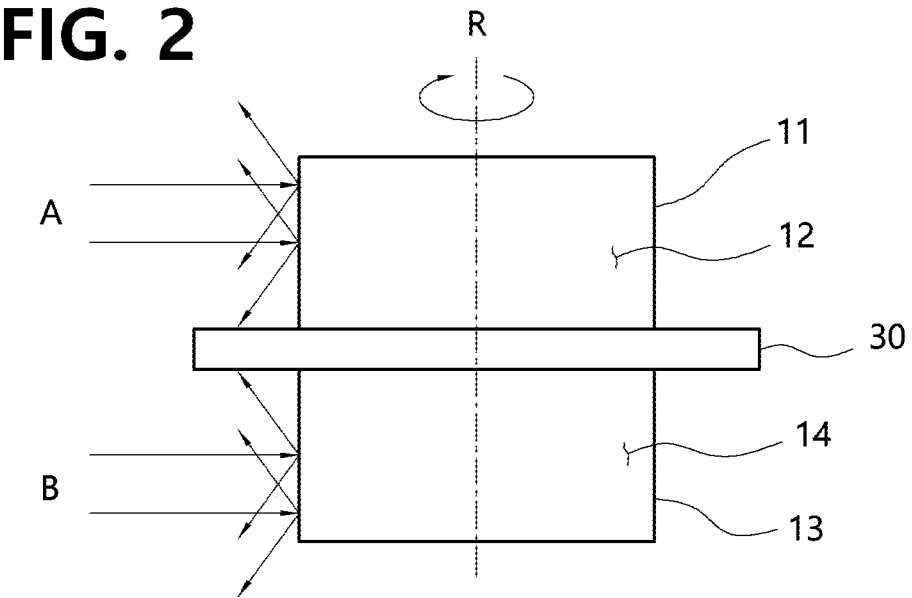
FIG. 2 is a cross-sectional view for explaining a function of a blocking plate of the light reflection device.
Figure 3:
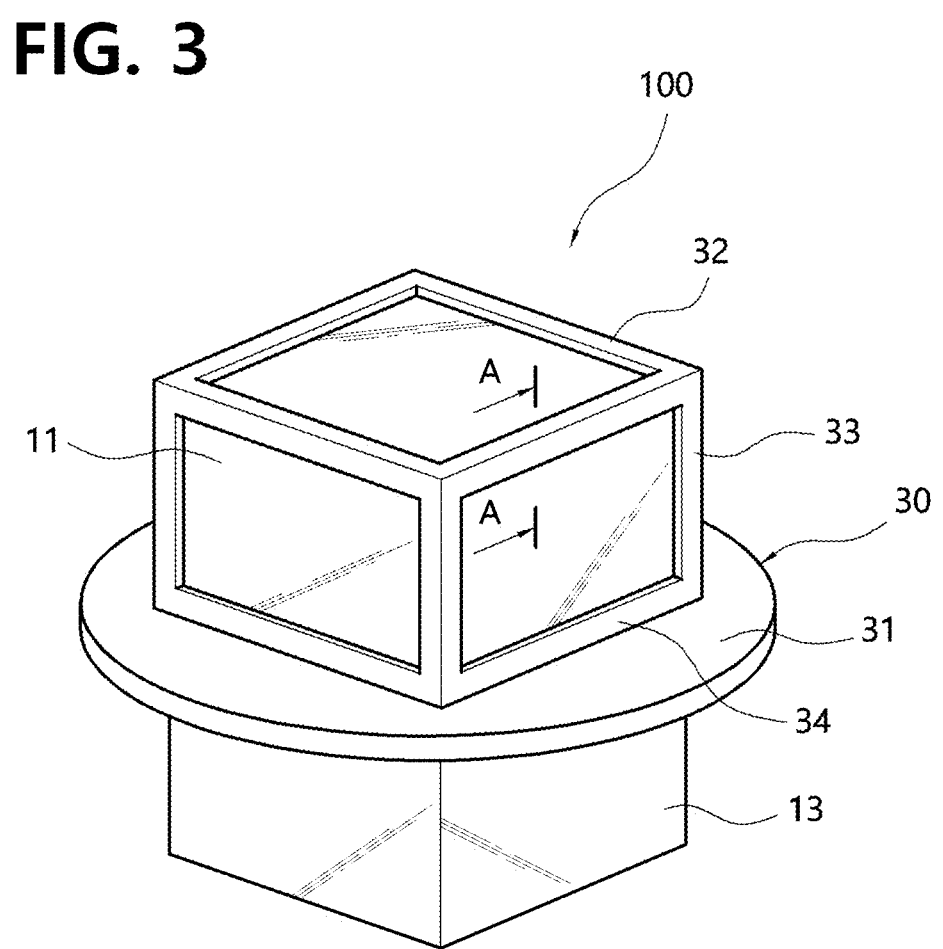
FIG. 3 is a perspective view illustrating the light reflection device on which a spatial division structure according to an embodiment of the present invention is mounted.

FIG. 1 is a perspective view illustrating a lidar system including a light reflection device. FIG. 2 is a cross-sectional view for explaining a function of a blocking plate of the light reflection device. FIG. 3 is a perspective view illustrating the light reflection device on which a spatial division structure according to an embodiment of the present invention is mounted.

A light reflection device 100 according to an embodiment of the present invention may be used to reflect pulsed laser beams in a lidar (light detection and ranging) scanning system that collects spatial information by emitting pulsed laser beams and sensing the pulsed laser beams reflected by an object 300.

Specifically, referring to FIG. 1, the light reflection device 100 according to the embodiment of the present invention refers to a device that reflects an optical signal, which is emitted from the light output means 200, toward the object 300 in a detection region or reflects the optical signal, which is reflected by the object 300, toward the light receiving means 400.

In this case, referring to FIG. 3, in the light reflection device 100 according to the embodiment of the present invention, a spatial division structure 30 having a blocking plate 31 is mounted on a rotary reflection structure 10, such that a reflective surface may be divided into a first reflective surface 11 and a second reflective surface 13. Therefore, as illustrated in FIG. 2, the light reflection device 100 according to the embodiment of the present invention may prevent interference between an optical signal A reflected by the first reflective surface 11 and an optical signal B reflected by the second reflective surface 13.

In this regard, the light reflection device 100 according to the embodiment of the present invention may use the unique spatial division structure 30 having a frame structure, thereby stably fixing the blocking plate 31 to the rotary reflection structure 10 without damaging the reflective surfaces 11 and 13. Hereinafter, the light reflection device 100 according to the embodiment of the present invention will be described in more detail with reference to the drawings, and the description will be focused on the spatial division structure 30.

Figure 4:
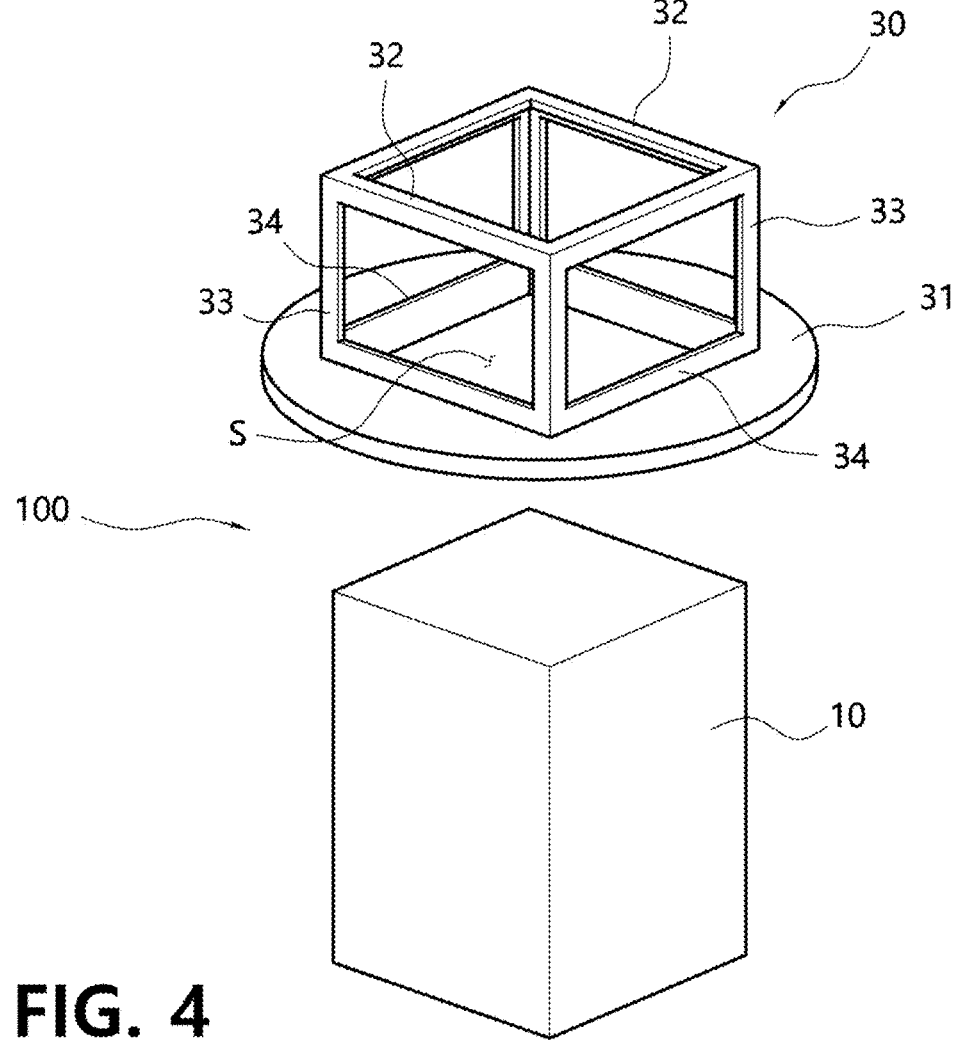
FIG. 4 is a perspective view illustrating a state in which a rotary reflection structure and the spatial division structure according to the embodiment of the present invention are separated.
Figure 5:
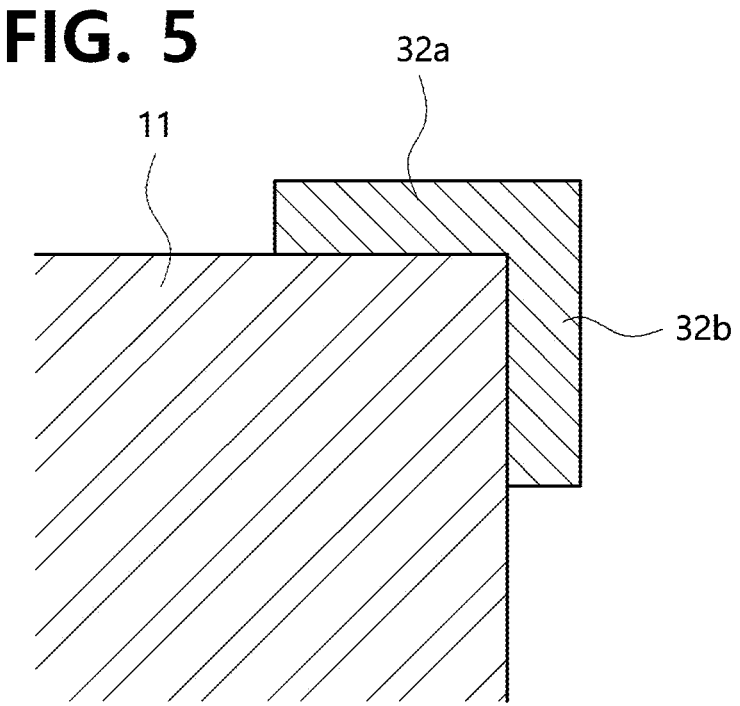
FIG. 5 is an enlarged cross-sectional view illustrating a cross-section taken along line A-A in FIG. 3.
Figure 6:
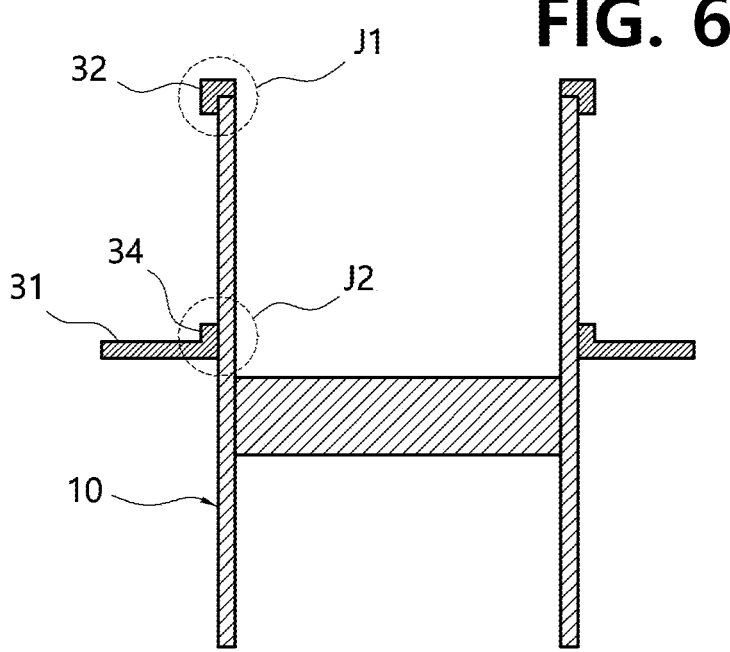
FIGS. 6 and 7 are cross-sectional views illustrating a cross-section of the light reflection device on which the spatial division structure according to the embodiment of the present invention is mounted.
Figure 7:
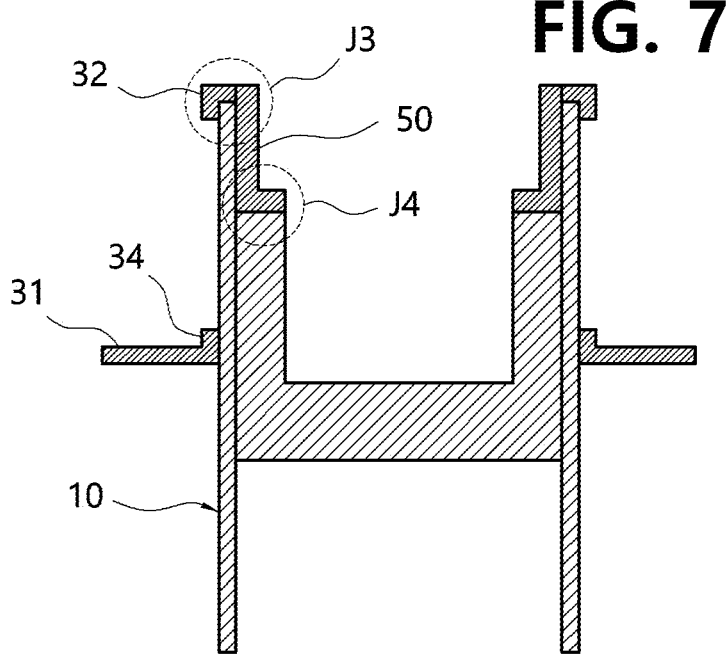
Figure 8:
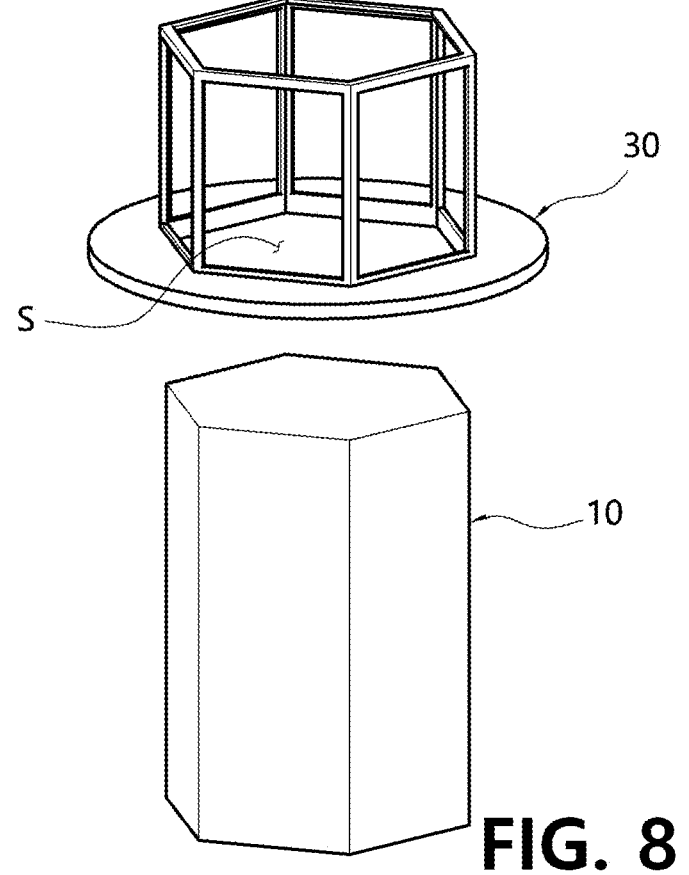
FIG. 8 is a perspective view illustrating a state in which a rotary reflection structure according to another example and the spatial division structure according to the embodiment of the present invention are separated.
Figure 9:
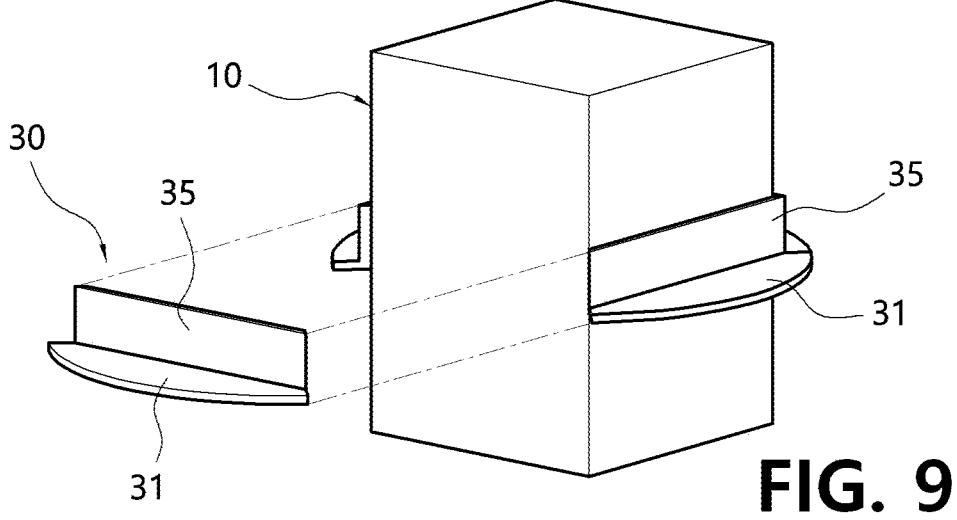
FIGS. 9 and 10 are perspective views illustrating various application examples in which the blocking plate is fixed to the light reflection device.
Figure 10:
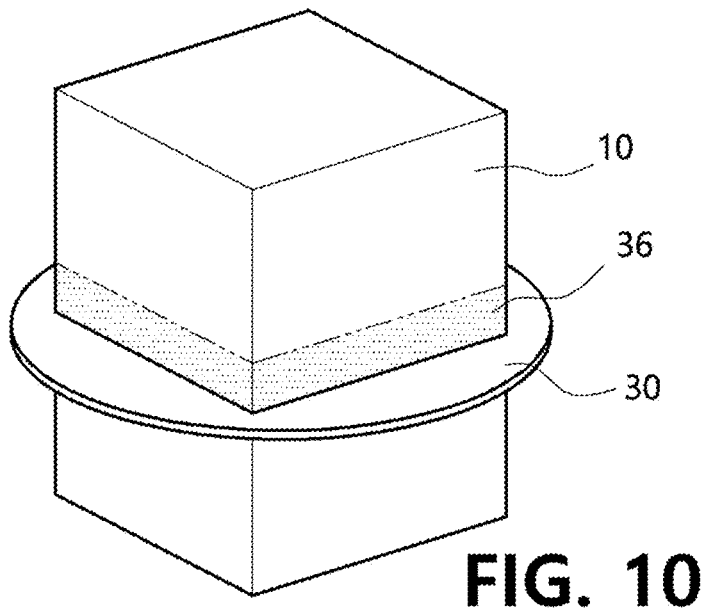

FIG. 3 is a perspective view illustrating the light reflection device on which the spatial division structure according to the embodiment of the present invention is mounted. FIG. 4 is a perspective view illustrating a state in which a rotary reflection structure and the spatial division structure according to the embodiment of the present invention are separated. FIG. 5 is an enlarged cross-sectional view illustrating a cross-section taken along line A-A in FIG. 3. FIGS. 6 and 7 are cross-sectional views illustrating a cross-section of the light reflection device on which the spatial division structure according to the embodiment of the present invention is mounted. FIG. 8 is a perspective view illustrating a state in which a rotary reflection structure according to another example and the spatial division structure according to the embodiment of the present invention are separated. FIGS. 9 and 10 are perspective views illustrating various application examples in which the blocking plate is fixed to the light reflection device.

The light reflection device 100 according to the embodiment of the present invention may include the rotary reflection structure 10 provided in the form of a polyhedron.

For example, as illustrated in FIG. 5, the rotary reflection structure 10 may have a rectangular parallelepiped shape. As another example, the rotary reflection structure 10 may have a hexagonal column shape as illustrated in FIG. 8. The shape of the rotary reflection structure 10 is not limited thereto. The rotary reflection structure 10 may have a column shape having a regular polygonal cross-section. This to allow both the reflective surfaces 11 and 13 constituting the rotary reflection structure 10 to have the same shape.

In the embodiment of the present invention, the rotary reflection structure 10 may have one or more reflective surfaces 11 and 13 in order to reflect the light. In this case, the reflective surfaces 11 and 13 may be disposed to be perpendicular to the ground surface in order to appropriately reflect the light.

In this case, the reflective surfaces 11 and 13 may each be made of a material advantageous in reflecting the light. As a non-restrictive example, the reflective surfaces 11 and 13 may be formed together with the rotary reflection structure 10 when the entire rotary reflection structure 10 is integrally formed by a process such as plastic injection molding, glass molding, or aluminum injection molding. Alternatively, the reflective surfaces of the rotary reflection structure 10 may be formed by forming the shape of the rotary reflection structure 10 first, separately manufacturing the reflective surfaces 11 and 13 each made of a material advantageous in reflection, and then attaching the reflective surfaces 11 and 13 to the rotary reflection structure 10.

In addition, the reflective surfaces 11 and 13 may be coated with a separate coating agent to selectively reflect light having a particular wavelength. In this case, in the light reflection device 100 according to the embodiment of the present invention, a coating process is performed at one time on both the first and second reflective surfaces 11 and 13 constituting the reflective surfaces 11 and 13, and then the spatial division structure 30 to be described below is mounted on the rotary reflection structure 10. Therefore, it is possible to improve light reflection reliability of the reflective surfaces 11 and 13. This configuration will be described in more detail with reference to the relevant parts.

Meanwhile, referring back to FIG. 1, the rotary reflection structure 10 may be connected to a motor (not illustrated) positioned therein and rotate about a rotation axis R. As a result, the rotary reflection structure 10 may repeatedly provide the different reflective surfaces 11 and 13 according to regular intervals. For example, when the rotary reflection structure 10 has a rectangular parallelepiped shape, the new reflective surfaces 11 and 13 may be provided each time the rotary reflection structure 10 rotates by 90 degrees. Therefore, the rotary reflection structure 10 may reflect the optical signal A toward the object 300 within a wider range instead of a single fixed direction, thereby expanding a detection range of the spatial information.

The light reflection device 100 according to the embodiment of the present invention may include the spatial division structure 30 to spatially divide the reflective surfaces 11 and 13 provided on the rotary reflection structure 10. In this case, the division may mean that a single region on a plane is divided into a plurality of regions.

More specifically, referring to FIGS. 3 and 4, the spatial division structure 30 may be mounted by being fitted with the rotary reflection structure 10 in an extension direction of the rotation axis R from above the rotary reflection structure 10. That is, the spatial division structure 30 may be formed in a shape similar to a hat shape and mounted in a shape seated on a part of the rotary reflection structure 10.

In this case, the spatial division structure 30 may include frames 32, 33, and 34 so that the blocking plate 31 is mounted on the spatial division structure 30.

Further, an insertion space S may be formed in the spatial division structure 30 so that the rotary reflection structure 10 is inserted into the insertion space S. In this case, the insertion space S may be famed to be coincident with a shape of a horizontal cross-section of the rotary reflection structure 10. For example, when the rotary reflection structure 10 has a rectangular parallelepiped shape, as illustrated in FIG. 5, the insertion space S has a quadrangular shape corresponding to the rectangular parallelepiped shape of the rotary reflection structure 10, such that the rotary reflection structure 10 and the blocking plate 31 of the spatial division structure 30 may not be spaced apart from each other.

In this case, the blocking plate 31 having a board shape may be provided outside the insertion space S. Specifically, the blocking plate 31 may extend from the reflective surfaces 11 and 13, which are in contact with the insertion space S, in a direction perpendicular to the rotation axis R. For example, an outer periphery of the blocking plate 31 has a circular shape, such that the blocking plate 31 may have a shape in which the insertion space S is formed in a circular plate.

In this case, because the blocking plate 31 is present, the single reflective surface 11 or 13 may be divided into the two reflective surfaces. Specifically, the single reflective surface may be divided into the first reflective surface 11 disposed in the region in which the frames 32, 33, and 34 are mounted and the second reflective surface 13 disposed in the region in which the frames 32, 33, and 34 are not mounted.

In the embodiment of the present invention, the spatial division structure 30 may include the frames 32, 33, and 34 connected to the blocking plate 31 so that the position of the blocking plate 31 may be fixed to the rotary reflection structure 10. In this case, the frames 32, 33, and 34 may implement a structure that may make it easy to mount the rotary reflection structure 10 and minimize a contact area with the reflective surfaces 11 and 13.

For example, referring to FIG. 4, the frames 32, 33, and 34 may each be a length member extending while surrounding a part of an edge constituting the rotary reflection structure 10 provided in the form of a polyhedron. In this case, as illustrated in FIG. 5, the frame may have a shape bent in a shape including surfaces that meet in a perpendicular direction and include a first surface 32a and a second surface 32b that meet together in a perpendicular direction. Therefore, the frames may maximally come into close contact with the reflective surfaces 11 and 13 of the rotary reflection structure 10, such that the frames may be stably mounted on the rotary reflection structure 10.

In the embodiment of the present invention, referring back to FIGS. 3 and 4, the frames 32, 33, and 34 may include first frames 33, second frames 32, and third frames 34 that are classified depending on positions thereof.

First, the first frame 33 may be a length member positioned at a lateral side of the first reflective surface 11 and extend in the direction of the rotation axis. For example, when the rotary reflection structure 10 has a rectangular parallelepiped shape as illustrated in FIG. 3, a total of four first frames 33 may be provided. The first frames 33 may serve to securely support the blocking plate 31 so that the blocking plate 31 does not sway in the horizontal direction. In addition, the first frames 33 may serve to connect the second frames 32, which will be described below, to the blocking plate 31.

Next, the second frame 32 may be a length member connected to the first frame 33 and extend in the horizontal direction so as to cross the first frame 33 at a position above the first reflective surface 11. For example, the second frame 32 may be perpendicularly connected to the first frame 33. When the rotary reflection structure 10 has a rectangular parallelepiped shape, a total of four second frames 32 may be provided. The second frames 32 may be partially in contact with the upper surface of the rotary reflection structure 10 and serve to fix the spatial division structure 30 so that the spatial division structure 30 does not move downward in the vertical direction.

Lastly, the third frame 34 is a length member disposed at a lower side of the first reflective surface 11 and provided to be in surface contact with the first reflective surface 11. The third frames 34 may connect the plurality of first frames 33. In this case, the third frame 34 may have a single flat surface without being bent, unlike the first and second frames 32 and 33, which are each formed in a shape including surfaces that meet in a perpendicular direction and extend while surrounding the edge. In this case, the third frame 34 may serve to reinforce supporting forces of the first and second frames 32 and 33.

Meanwhile, in the embodiment of the present invention, as a contact area between the first reflective surface 11 and each of the frames 32, 33, and 34 decreases, an area of the reflective surface capable of reflecting the light may be maximized, thereby obtaining an advantage related to the reflection of the light. Therefore, it is advantageous to minimize a width of the frame in consideration of the light reflection efficiency. However, because the frames 32, 33, and 34 are configured to stably fix the spatial division structure 30 to the rotary reflection structure 10, the width of the frame needs to be minimized within a range in which the supporting forces made by the frames 32, 33, and 34 are sufficiently ensured.

In the embodiment of the present invention, regarding the process of manufacturing the spatial division structure 30, the spatial division structure 30 may be integrally foamed in the state in which all the blocking plate 31 and the frames 32, 33, and 34 are connected. In this case, for example, the configuration in which the spatial division structure 30 is integrally famed means that the spatial division structure 30 is manufactured to be connected as a whole by a process such as plastic injection molding, metal casting, or forging.

Therefore, it is possible to ensure the secure supporting forces famed between the blocking plate 31 and the frames 32, 33, and 34. Therefore, it is possible to stably fix the spatial division structure 30 to the rotary reflection structure 10 even though the widths of the frames 32, 33, and 34 are greatly increased. As a result, it is possible to maximally ensure the reflection area and reduce the size of the rotary reflection structure 10 by minimizing the contact areas between the frames 32, 33, and 34 and the first reflective surface 11.

However, the manufacturing method is not limited to the configuration in which the spatial division structure 30 of the light reflection device 100 according to the embodiment of the present invention is integrally formed. It is noted that a process of separately manufacturing the blocking plate 31 and the frames 32, 33, and 34 and assembling the blocking plate 31 and the frames 32, 33, and 34 may be applied in consideration of manufacturing convenience.

In the embodiment of the present invention, as illustrated in FIG. 6, a bonding agent may be applied between the rotary reflection structure 10 and the frames 32, 33, and 34, as necessary. This is to more stably fix and mount the spatial division structure 30 to the rotary reflection structure 10. For example, the bonding agent may be applied onto the second frames 32 and an upper portion of the first reflective surface 11 (a portion indicated by J1 in FIG. 6) or onto the third frames 34 and a lower portion of the first reflective surface 11 (a portion indicated by J2 in FIG. 6). However, the application region of the bonding agent is not limited thereto.

Referring to FIG. 7, in the embodiment of the present invention, a separate coupling member 50 may be provided to fix the frames 32, 33, and 34 to the rotary reflection structure 10. For example, as illustrated in FIG. 7, the coupling member 50 is positioned in the internal space of the rotary reflection structure 10. One side portion of the coupling member 50 is connected to the frames 32, 33, and 34, and the other side portion of the coupling member 50 is connected to the inside of the rotary reflection structure 10, such that the coupling member 50 may fix the spatial division structure 30 to the rotary reflection structure 10. In this case, fixing means such as bolts may be used to connect portions J3 between the frames 32, 33, and 34 and the coupling member 50 or a portion J4 between the rotary reflection structure 10 and the coupling member 50.

Alternatively, the frames 32, 33, and 34 of the spatial division structure 30 may accurately correspond to the shape of the rotary reflection structure 10. That is, the spatial division structure 30 and the rotary reflection structure 10 may be stably present without being spatially spaced apart from each other. Therefore, it is noted that the separate coupling member 50 or the bonding process may not be needed after the spatial division structure 30 is fitted with the rotary reflection structure 10.

Because the frame structure is applied to the spatial division structure 30 according to the embodiment of the present invention as described above, it is possible to obtain various advantages in comparison with the other methods capable of fixing the blocking plate 31 to the rotary reflection structure 10.

For example, in a case in which the blocking plates 31 are fixed directly to the reflective surfaces 11 and 13 as illustrated in FIG. 9, a process such as bolting is performed during a process of coupling fixing parts 35 to the reflective surfaces 11 and 13. For this reason, there is a likelihood that the reflective surfaces 11 and 13 are damaged. In contrast, in the embodiment of the present invention, the frame structure is used, and the spatial division structure 30 is structurally mounted on the rotary reflection structure 10, such that the blocking plate 31 may be stably provided without damaging the reflective surfaces 11 and 13.

In addition, as illustrated in FIG. 10, in a case in which the rotary reflection structure 10 and the blocking plate 31 are integrated by plastic injection molding, there is a problem in that a coating process is not easily performed. Specifically, in this case, there may be an inconvenience in that coating processes need to be separately performed on the first reflective surface 11 and the second reflective surface 13 based on the blocking plate 31. Furthermore, because the coating process is not smoothly performed on a bent portion 36 where the blocking plate 31 and the rotary reflection structure 10 meet together, there may be a problem with reliability of light reflection performance. In contrast, when the spatial division structure 30 according to the embodiment of the present invention is used, the coating process may be integrally performed on the entire region of the reflective surfaces 11 and 13 constituting the rotary reflection structure 10, thereby improving workability. In addition, in this case, because the rotary reflection structure 10 does not include a bent portion that may hinder the coating process, uniform coating performance may be ensured for the entire reflective surfaces.

As described above, the spatial division structure 30 of the light reflection device 100 according to the embodiment of the present invention may divide the reflective surfaces 11 and 13 into the first reflective surface 11 and the second reflective surface 13. Hereinafter, an effect, which may be obtained by the configuration in which the blocking plate 31 of the light reflection device 100 according to the embodiment of the present invention divides the space, will be described in more detail.

For example, referring back to FIGS. 1 and 2, in the light reflection device 100 according to the embodiment of the present invention, the first reflective surface 11 is positioned at the same height as the light output means 200. Therefore, the optical signal A emitted from the light output means 200 may be deflected in a direction toward the first reflective surface 11. In contrast, the second reflective surface 13 may be disposed to appropriately reflect the optical signal B, which is reflected from the object 300, toward the light receiving means 400. That is, the configuration in which a target object for the optical signal reflected by the second reflective surface 13 and a target object for the optical signal reflected by the first reflective surface 11 are different from each other may be related to a position relative to the light receiving means 400.

As described above, in the light reflection device 100 according to the embodiment of the present invention, the first reflective surface 11 and the second reflective surface 13 are distinguished so that an optical signal A mainly reflected by the first reflective surface 11 and an optical signal B mainly reflected by the second reflective surface 13 are different from each other. Further, the blocking plate 31 is disposed between the first reflective surface 11 and the second reflective surface 13. Therefore, it is possible to minimize interference between the optical signals A and B respectively reflected by the reflective surfaces 11 and 13. In addition, because the blocking plate 31 is disposed, it is also possible to reduce interference between the optical signals A and B for collecting the spatial information and a plurality of inner scattered light beams generated while the optical signals are reflected by the reflective surfaces. Therefore, it is possible to improve reliability related to the analysis of the spatial information by collecting the optical signals A and B.

As described above, in the light reflection device 100 according to the embodiment of the present invention, the spatial division structure 30 having the blocking plate 31 is mounted on the rotary reflection structure 10 and divides the region of the reflective surface, which makes it possible to obtain the spatial information with higher reliability.

Furthermore, the spatial division structure 30 mounted on the light reflection device 100 according to the embodiment of the present invention has the frame structure, such that the safely blocking plate 31 may be fixed to the rotary reflection structure 10 without damaging the reflective surface. In addition, because the spatial division structure 30 is separately mounted on the rotary reflection structure 10, the coating process may be advantageously performed on the rotary reflection structure 10, and the coating performance may also be ensured. Further, because the light reflection device 100 is implemented by the simple insertion mounting structure, it is possible to ensure convenience related to the manufacturing process.

While the embodiments of the present invention have been described above, the spirit of the present invention is not limited to the embodiments presented in the present specification, those skilled in the art, who understand the spirit of the present invention, may easily propose other embodiments by adding, changing, deleting constituent elements within the same spirit and scope of the present invention, and it can be said that the embodiments are also within the spirit and scope of the present invention.

DESCRIPTION OF REFERENCE NUMERALS

10: Rotary reflection structure
11: First reflective surface
13: Second reflective surface
30: Spatial division structure
31: Blocking plate
32: Second frame
33: First frame
34: Third frame
J1, J2: Bonding portion
50: Coupling member
J3, J4: Coupling portion
100: Light reflection device
200: Light output means
300: Object
400: Light receiving means
B: Optical signal

What is claimed is:

1. A spatial division structure, which is mounted to divide a reflective surface of a rotary reflection structure provided in the form of a polyhedron and configured to reflect light, the spatial division structure comprising:

a blocking plate having therein an insertion space into which the rotary reflection structure is inserted, the blocking plate having a board shape extending in a direction perpendicular to a rotation axis of the rotary reflection structure from the reflective surface to divide the reflective surface into a first reflective surface and a second reflective surface; and frames configured to fix a position of the blocking plate to the reflective surface, wherein the frames comprise:

one or more first frames connected to the blocking plate and positioned at a lateral side of the first reflective surface, the one or more first frames extending in a direction of the rotation axis of the rotary reflection structure; and one or more second frames each connected to one end of each of one or more first frames and positioned at an upper side of the first reflective surface, the one or more second frames extending to cross the one or more first frames; and a third frame formed to adjoin a lower side of the first reflective surface and extending to cross the one or more first frames.

2. The spatial division structure of claim 1, wherein the polyhedron on which the spatial division structure is mounted has a rectangular parallelepiped shape.

3. The spatial division structure of claim 1, wherein an outer periphery of the blocking plate has a circular shape.

4. The spatial division structure of claim 1, wherein the insertion space is coincident with a horizontal cross-sectional shape of the rotary reflection structure.

5. The spatial division structure of claim 1, wherein the one or more first frames and the one or more second frames are positioned to be perpendicular to each other.

6. The spatial division structure of claim 1, wherein one or more of the one or more first frames and the one or more second frames extend while surrounding an edge constituting the rotary reflection structure.

7. The spatial division structure of claim 6, wherein one or more of the one or more first frames and the one or more second frames are bent in a shape including surfaces that meet in a perpendicular direction.

8. The spatial division structure of claim 1, wherein a bonding agent is applied onto at least a part of a contact surface of the frame, which adjoins the first reflective surface among the first to third frames, such that the spatial division structure is fixed to the rotary reflection structure.

9. The spatial division structure of claim 1, wherein the spatial division structure is fixed to the rotary reflection structure by using a coupling member having one side portion connected to at least any one of the first to third frames and the other side portion connected to the rotary reflection structure.

10. The spatial division structure of claim 1, wherein the spatial division structure is integrally manufactured in a state in which the spatial division structure includes all the blocking plate, the one or more first frames, and the one or more second frames.

11. The spatial division structure of claim 1, wherein spatial division structure is formed in a hat shape.

12. A light reflection device comprising:

a rotary reflection structure provided in the form of a polyhedron and having one or more reflective surfaces configured to reflect light; and a spatial division structure mounted by being fitted with the rotary reflection structure in a direction of a rotation axis from above the rotary reflection structure to divide the reflective surface, wherein the spatial division structure comprises:

a blocking plate having therein an insertion space into which the rotary reflection structure is inserted, the blocking plate having a board shape extending in a direction perpendicular to a rotation axis of the rotary reflection structure from the reflective surface to divide the reflective surface into a first reflective surface and a second reflective surface; and frames configured to fix a position of the blocking plate to the reflective surface, and wherein the frames comprise:

one or more first frames connected to the blocking plate and positioned at a lateral side of the first reflective surface, the one or more first frames extending in a direction of the rotation axis of the rotary reflection structure; and one or more second frames each connected to one end of each of one or more first frames and positioned at an upper side of the first reflective surface, the one or more second frames extending to cross the one or more first frames; and a third frame formed to adjoin a lower side of the first reflective surface and extending to cross the one or more first frames.

13. A lidar scanning system comprising:

the light reflection device according to claim 12;

a light output means configured to emit an optical signal toward the light reflection device according to claim 12; and a light receiving means configured to receive the optical signal reflected from the light reflection device according to claim 12, wherein the optical signal is a pulsed laser beam.

* * * * *